(12) United States Patent
Watanabe et al.

(10) Patent No.: US 11,511,383 B2
(45) Date of Patent: Nov. 29, 2022

(54) CONTROL DEVICE, CALCULATION DEVICE, AND CONTROL METHOD

(71) Applicant: FANUC CORPORATION, Yamanashi (JP)

(72) Inventors: Daiki Watanabe, Yamanashi-ken (JP); Ryousuke Suganuma, Yamanashi-ken (JP); Riho Kubota, Yamanashi-ken (JP); Hikaru Tamura, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 436 days.

(21) Appl. No.: 16/838,434

(22) Filed: Apr. 2, 2020

(65) Prior Publication Data
US 2020/0316744 A1 Oct. 8, 2020

(30) Foreign Application Priority Data
Apr. 5, 2019 (JP) .............................. JP2019-072812

(51) Int. Cl.
*B23Q 17/22* (2006.01)
*B23Q 15/14* (2006.01)
*B23Q 17/00* (2006.01)
*B23Q 17/20* (2006.01)

(52) U.S. Cl.
CPC ......... *B23Q 17/2233* (2013.01); *B23Q 15/14* (2013.01); *B23Q 17/003* (2013.01); *B23Q 17/20* (2013.01)

(58) Field of Classification Search
CPC .. B23Q 17/2233; B23Q 15/14; B23Q 17/003; B23Q 17/20; B23Q 17/22
See application file for complete search history.

(56) References Cited

U.S. PATENT DOCUMENTS

| | | | | |
|---|---|---|---|---|
| 6,998,561 B2* | 2/2006 | Kato | ...................... | B23H 7/065 |
| | | | | 700/162 |
| 9,463,520 B2* | 10/2016 | Sugie | ....................... | B23H 7/10 |
| 10,512,980 B2* | 12/2019 | Masuda | ................... | B23H 7/26 |
| 10,646,939 B2* | 5/2020 | Nakagawa | ............. | B23H 11/00 |
| 10,864,587 B2* | 12/2020 | Hashimoto | ........... | B23H 7/065 |

FOREIGN PATENT DOCUMENTS

| | | |
|---|---|---|
| JP | H02279220 A | 11/1990 |
| JP | H11320266 A | 11/1999 |
| JP | 2000-024839 A | 1/2000 |

* cited by examiner

*Primary Examiner* — Christopher W Fulton
(74) *Attorney, Agent, or Firm* — Robert P. Michal, Esq.; Carter, DeLuca & Farrell LLP

(57) ABSTRACT

A wire electrical discharge machine acquires measured dimensions of a test workpiece that has been machined with a wire electrode inclined at a given angle with respect to a running direction in which the wire electrode runs; and calculates, based on the measured dimensions, first actual information indicating an actual holding position at which the wire electrode is actually held at a first die guide for guiding the wire electrode to a workpiece, and second actual information indicating an actual holding position at which the wire electrode is actually held at a second die guide for guiding the wire electrode sent from the workpiece, and, when necessary, the wire electrical discharge machine rewrites first information and second information stored in a storage unit to the calculated first actual information and second actual information.

13 Claims, 9 Drawing Sheets

CONTROL DEVICE, CALCULATION DEVICE, AND CONTROL METHOD

CROSS-REFERENCE TO RELATED APPLICATION

This application is based upon and claims the benefit of priority from Japanese Patent Application No. 2019-072812 filed on Apr. 5, 2019, the contents of which are incorporated herein by reference.

BACKGROUND OF THE INVENTION

Field of the Invention

The present invention relates to a wire electrical discharge machine for machining a workpiece using a wire electrode.

Description of the Related Art

The wire electrical discharge machine, in some cases, may machine a workpiece using a wire electrode being inclined at a given angle with respect to a running direction in which the wire electrode runs (i.e., a feeding direction). A method for improving machining accuracy in such a case is disclosed in Japanese Laid-Open Patent Publication No. 2000-024839.

In the method described in Japanese Laid-Open Patent Publication No. 2000-024839, on the basis of errors between inputted actually measured dimensions of a taper-machined test-workpiece and its target dimensions, the method calculates compensation values for respective movements of a plurality of axes (X axis, Y axis, U axis, V axis) in the wire electrical discharge machine, and then compensates the amounts of movement of the axes according to the compensation values.

SUMMARY OF THE INVENTION

However, if the position of the wire electrode based on the machine coordinate system defined in a control device of the wire electrical discharge machine is shifted from the actual position of the wire electrode, in the running direction thereof or in the reverse direction thereof, then the wire electrode is inclined at an angle different from the angle specified by the machining program. Consequently, machining accuracy is not improved even when the amounts of movement of the axes are compensated by the method described in Japanese Laid-Open Patent Publication No. 2000-024838.

Thus, an object of the present invention is to provide a control device, a calculation device, and a control method that can improve machining accuracy.

A first aspect of the present invention provides a control device of a wire electrical discharge machine that machines a workplace by causing electrical discharge at an electrode gap between the workpiece and a wire electrode that runs along a given running direction. The control device includes: a storage unit configured to store first information indicating a holding position of the wire electrode at a first, die guide configured to guide the wire electrode to the workpiece, and second information indicating a holding position of the wire electrode at a second die guide configured to guide the wire electrode sent from the workpiece; a movement control unit configured to, using the first information and the second information, relatively move at least one of the first die guide and the second die guide relative to a test workpiece being the workpiece so that the wire electrode inclines at a given angle with respect to the running direction; a dimension acquisition unit configured to acquire a measured dimension of the test workplace that has been machined with the wire electrode inclined; a computation unit configured to calculate, based on the measured dimension, first actual information indicating an actual holding position at which the wire electrode is actually held at the first die guide, and second actual information indicating an actual holding position at which the wire electrode is actually held at the second die guide; and a compensation unit configured to rewrite the first information to the first actual information if the first information and the first actual information differ from each other, and to rewrite the second information to the second actual information if the second information and the second actual information differ from each other.

According to a second aspect of the present invention, a calculation device includes: a dimension acquisition unit configured to acquire a measured dimension of a test workpiece that has been machined with a wire electrode inclined at a given angle with respect to a running direction of the wire electrode; a first computation unit configured to calculate, based on the measured dimension, first actual information indicating an actual holding position of the wire electrode at which the wire electrode is actually held at a first die guide configured to guide the wire electrode to a workpiece; a second computation unit configured to calculate, based on the measured dimension, second actual information indicating an actual holding position of the wire electrode at which the wire electrode is actually held at a second die guide configured to guide the wire electrode sent from the workpiece; and an output unit configured to output the first actual information and the second actual information to a control device of a wire electrical discharge machine that has machined the test workpiece.

A third aspect of the present invention provides a method for controlling a wire electrical discharge machine that machines a workpiece by causing electrical discharge at an electrode gap between the workpiece and a wire electrode that runs along a given running direction. The control method includes: a reading step of reading from a storage unit, first information indicating a holding position of the wire electrode at a first die guide configured to guide the wire electrode to the workpiece, and second information indicating a holding position of the wire electrode at a second die guide configured to guide the wire electrode sent from the workpiece; a movement control step of relatively moving, using the first information and the second information, at least one of the first die guide and the second die guide relative to a test workpiece being the workpiece so that the wire electrode inclines at a given angle with respect to the running direction; a dimension acquisition step of acquiring a measured dimension of the test workpiece that has been machined with the wire electrode inclined; a computation step of calculating, based on the measured dimension, first actual information indicating an actual holding position at which the wire electrode is actually held at the first die guide, and second actual information indicating an actual holding position at which the wire electrode is actually held at the second die guide; and a compensation step of rewriting the first information to the first actual information if the first information and the first actual information differ from each other, and rewriting the second information to the second actual information if the second information and the second actual information differ from each other.

According to the present invention, it is possible to prevent the workpiece from being machined at an angle different from an angle specified by a machining program when the wire electrode is inclined. This improves machining accuracy.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

The present invention will now be described in detail referring to the accompanying drawings in conjunction with preferred embodiments.

Embodiment

Figure 1:
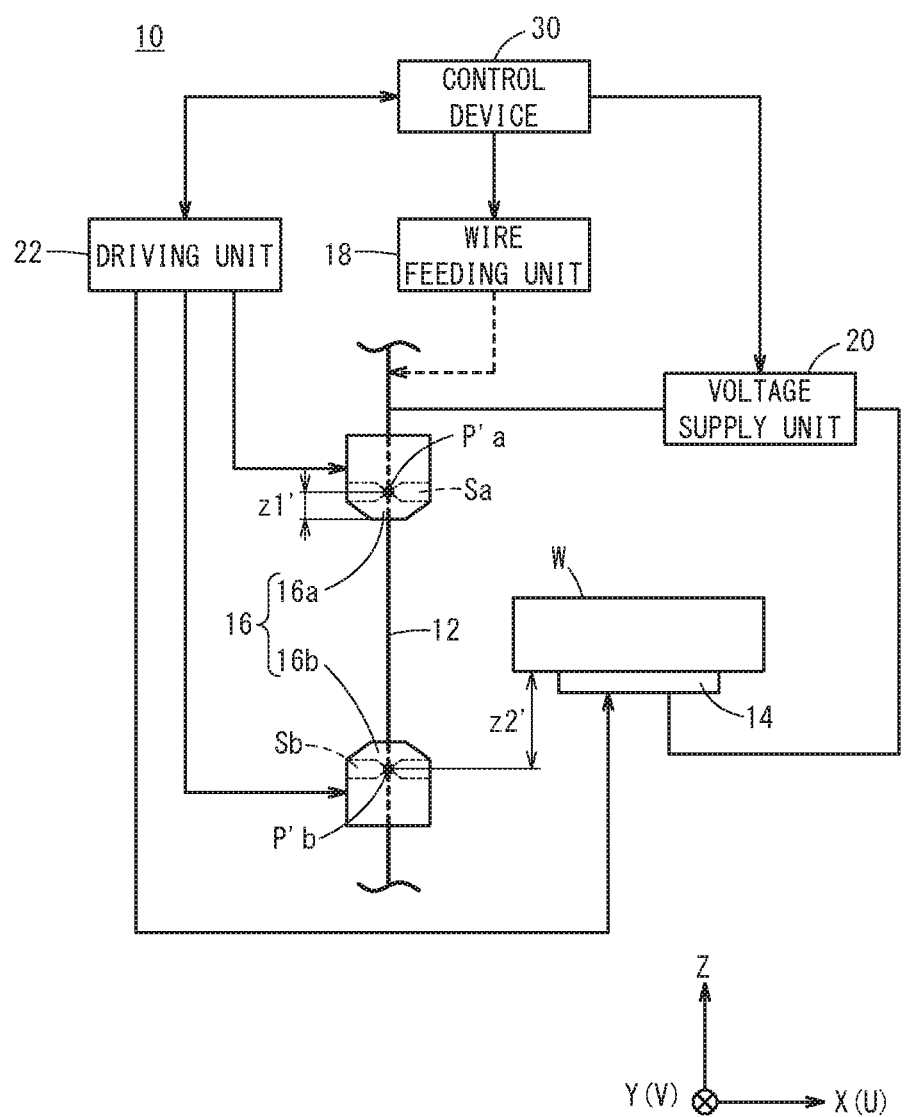
FIG. 1 is a schematic diagram illustrating the configuration of part of a wire electrical discharge machine according to an embodiment.

FIG. 1 is a schematic diagram illustrating the configuration of part of a wire electrical discharge machine 10 according to an embodiment. The wire electrical discharge machine 10 is configured to machine a workpiece W by causing electrical discharge at electrode gap between the workpiece W and a wire electrode 12 running along a given running direction (i.e., a feeding direction). The wire electrical discharge machine 10 includes the wire electrode 12, a table 14, die guides 16, a wire feeding unit 18, a voltage supply unit 20, a driving unit 22, and a control device 30.

FIG. 1 shows an X direction (U direction), a Y direction (V direction), and a Z direction in a machine coordinate system defined by the control device 30. The X direction, Y direction, and Z direction are orthogonal to each other, the X direction and U direction are the same direction, and the Y direction and V direction are the same direction.

The wire electrode 12 is formed of wire material of tungsten-based, copper alloy-based, or brass-based metal, for example. The workpiece W is placed on the table 14.

The die guides 16 are configured to guide the wire electrode 12. The die guides 16 include a first die guide 16a for guiding the forward or upper portion of the wire electrode 12 to the workpiece W, and a second die guide 16b for guiding the rearward or lower portion of the wire electrode 12 sent from the workpiece W.

The first die guide 16a is disposed on one end side of the wire electrode 12 (on the Z direction side) relative to the table 14 (workpiece W), and the first die guide 16a includes a holding portion Sa for holding the wire electrode 12. The second die guide 16b is disposed on the other end side of the wire electrode 12 (on the −Z direction side) relative to the table 14 (workpiece W), and the second die guide 16b includes a holding portion Sb for holding the wire electrode 12.

The wire feeding unit 18 is adapted to feed the wire electrode 12 toward the first die guide 16a. The wire feeding unit 18 includes a roller for feeding the wire electrode 12 and a feeding motor for driving the roller.

The voltage supply unit 20 is adapted to supply a pulse voltage between the wire electrode 12 and the workpiece W placed on the table 14. The voltage supply unit 20 includes a pulse power source connected to the wire electrode 12 and the table 14.

The driving unit 22 is adapted to separately drive the table 14, the first die guide 16a, and the second die guide 16b. The driving unit 22 includes motors for the X direction and Y direction and a power transmitting mechanism for converting the rotational forces of the motors into linear forces in the X direction and Y direction and transmitting the linear forces. The driving unit 22 further includes motors for the U direction and V direction for each of the first die guide 16a and the second die guide 16b, and a power transmitting mechanism for converting the rotational forces of the motors into linear forces in the U direction and V direction and transmitting the linear forces.

The control device 30 is configured to control the wire feeding unit 18, voltage supply unit 20, and driving unit 22. When controlling the wire feeding unit 18, the control device 30 controls the feeding motor of the wire feeding unit 18 to cause the wire electrode 12 to run at a given feedrate along the running direction (−Z direction).

When controlling the voltage supply unit 20, the control device 30 controls the pulse power source of the voltage supply unit 20 to cause electrical discharge at electrode gap between the wire electrode 12 and the workpiece U placed on the table 14.

When controlling the driving unit 22, the control device 30 controls the driving unit 22 to drive at least one of the table 14, first die guide 16a, and second die guide 16b on the basis of the machine coordinate system. Specifically, the control device 30 controls at least one of the motors for X direction, Y direction, U direction, and V direction provided in the driving unit 22 according to a machining program, to thereby relatively move the wire electrode 12 relative to the workpiece W placed on the table 14.

Figure 2:
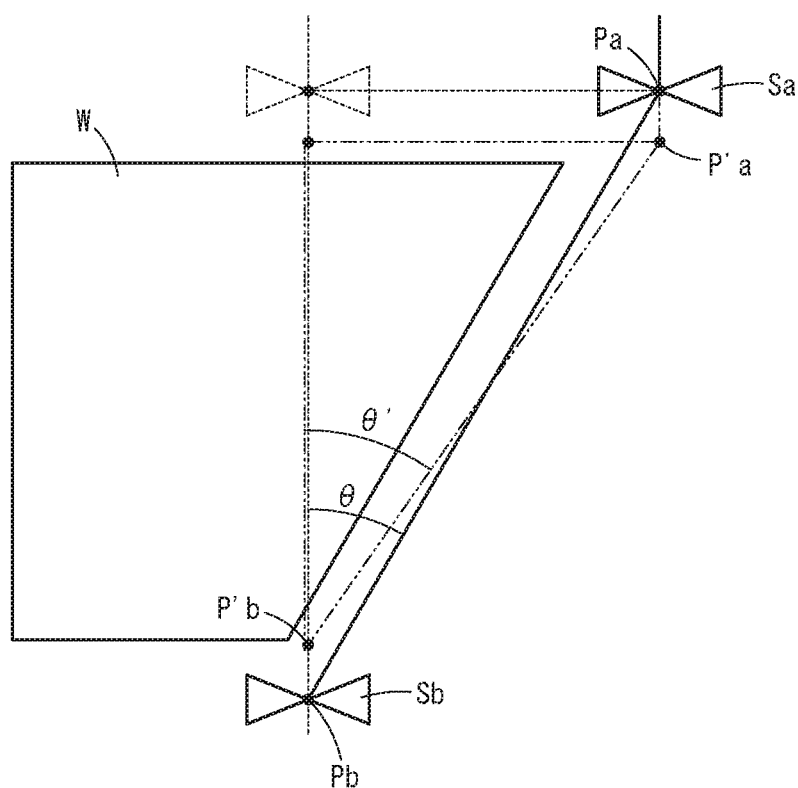
FIG. 2 is a diagram illustrating a difference between positions at which the wire electrode is actually held and holding positions of the wire electrode that are recognized by a control device.

FIG. 2 is a diagram illustrating a difference between actual holding positions Pa, Pb at which the wire electrode 12 is actually held and holding positions P'a, P'b of the wire electrode 12 that are recognized by the control device 30. During machining process, the wire electrode 12 may be inclined at a given angle θ with respect to a running direction in which the wire electrode 12 runs (i.e., the electrode is fed). In this case, the wire electrode 12 bends at the holding portion Sa of the first die guide 16a and at the holding portion Sb of the second die guide 16b. The bent portions of the wire electrode 12 correspond to the actual holding positions Pa, Pb at which the wire electrode 12 is actually held.

However, the actual holding positions Pa, Pb of the wire electrode 12 and the holding positions P'a, P'b of the wire electrode 12 recognized by the control device 30 may deviate from each other in the direction in which the wire electrode 12 runs (in the −Z direction) or in the reverse direction (in the Z direction). In this case, the angle θ at which the wire electrode 12 is actually inclined differs from an angle θ' that is specified by the machining program.

Figure 3:
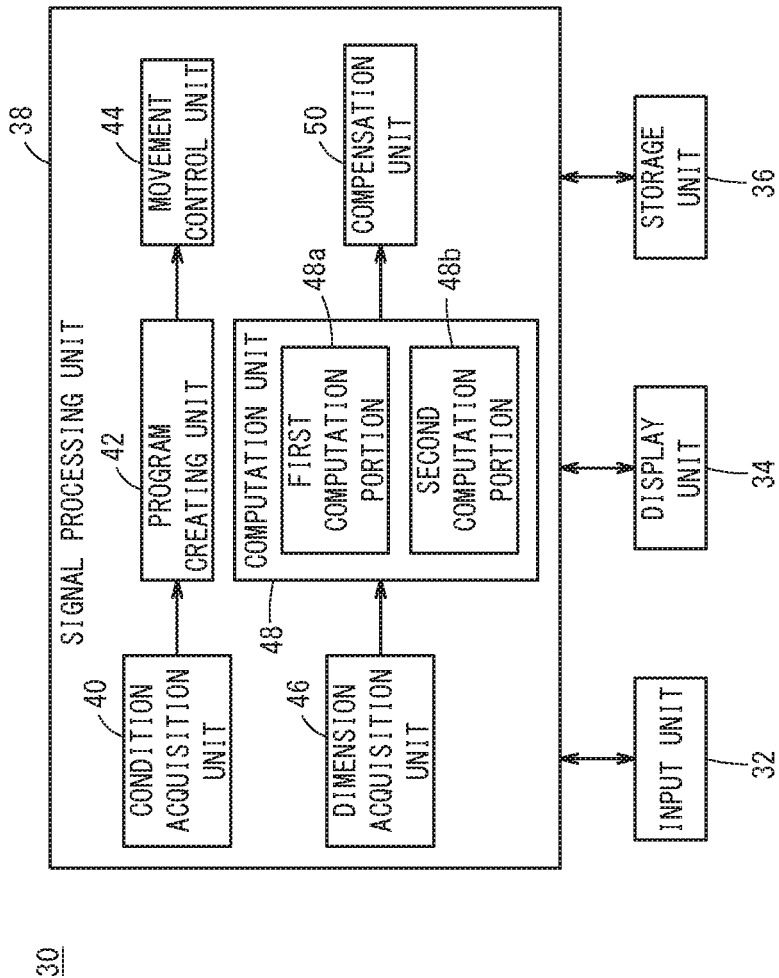
FIG. 3 is a schematic diagram illustrating a configuration of part of the control device.

For dealing with this, in this embodiment, the control device 30 is provided with a function to make compensations to achieve the actual holding positions Pa, Pb of the wire electrode 12. FIG. 3 is a schematic diagram illustrating a configuration of part of the control device 30.

The control device 30 includes an input unit 32, a display unit 34, a storage unit 36, and a signal processing unit 38. The input unit 32 is configured to allow input of information. Specific examples of the input unit 32 include a mouse, a keyboard, and a touchscreen panel disposed on a display screen of the display unit 34. The display unit 34 is configured to display information. Specific examples of the display unit 34 include a liquid crystal display, for example. The storage unit 36 is configured to store information. Specific examples of the storage unit 36 include a hard disk, for example.

The storage unit 36 has previously stored therein first information indicating the holding position P'a of the wire electrode 12 at the first die guide 16*a* and second information indicating the holding position P'b of the wire electrode 12 at the second die guide 16*b*. The storage unit 36 further has previously stored therein a compensation program for compensating the first information and the second information. The first information and the second information are generated based on the machine coordinate system defined by the control device 30.

Specifically, the first information may be a distance from a reference position to the holding position P'a along the ±Z direction (along the running direction of the wire electrode 12 or the reverse direction), or may be the coordinates of the holding position P'a. In this embodiment, as shown in FIG. 1, the end surface of the first die guide 16*a* on the feeding-out side is defined as the reference position, and the first information indicates a distance z1' from the reference position to the holding position P'a along the Z direction.

Specifically, the second information may be a distance from a reference position to the holding position P'b along the ±Z direction (along the running direction of the wire electrode 12 or the reverse direction), or may be the coordinates of the holding position P'b. In this embodiment, as shown in FIG. 1, the placement surface of the table 14 on which the workpiece W is placed is defined as the reference position, and the second information indicates a distance z2' from the reference position to the holding position P'b along the −Z direction.

As shown in FIG. 3, the signal processing unit 38 includes a processor. The processor executes the compensation program stored in the storage unit 36, so that the signal processing unit 38 functions as a condition acquisition unit 40, a program creating unit 42, a movement control unit 44, a dimension acquisition unit 46, a computation unit 48, and a compensation unit 50.

The condition acquisition unit 40 is configured to acquire machining conditions for a test workpiece. The condition acquisition unit 40 acquires, as the machining conditions, at least an angle of the wire electrode 12 with respect to its running direction and a thickness of the test workpiece. The condition acquisition unit 40 may acquire machining conditions specified by an operator using the input unit 32, or may acquire machining conditions stored in the storage unit 36 in advance.

Figure 4:
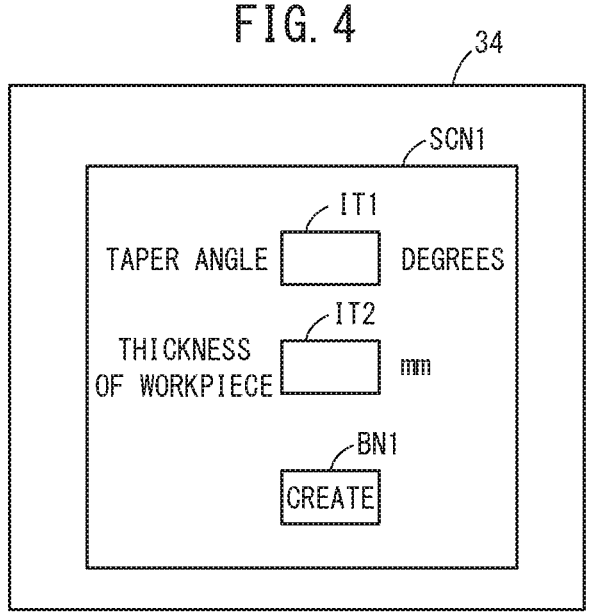
FIG. 4 is a diagram illustrating a condition input screen.

In this embodiment, it is assumed that the condition acquisition unit 40 acquires machining conditions specified by an operator using the input unit 32. That is, as shown in FIG. 4, for example, the condition acquisition unit 40 causes the display unit 34 to display a condition input screen SCN1 for input of an angle of the wire electrode 12 with respect to its running direction and a thickness of the test workpiece. This enables the operator to clearly grasp the machining conditions that are necessary to create a machining program for test.

The condition input screen SCN1 includes an input item IT1 for input of an angle of the wire electrode 12 with respect to its running direction, an input item IT2 for input of a thickness of the test workpiece, and a create button BN1 for starting creation of the program using the values inputted to the input items IT1 and IT2. The operator specifies values respectively for the input items IT1 and IT2 using the input unit 32, and thereafter operates the create button BN1.

The program creating unit 42 is configured to create the test machining program on the basis of the machining conditions acquired by the condition acquisition unit 40. The program creating unit 42 creates the test machining program on the basis of the angle of the wire electrode 12 with respect to its running direction and the thickness of the test workpiece that the condition acquisition unit 40 has acquired as machining conditions. This reduces time and labor required for the operator to create the test machining program.

In this embodiment, the program creating unit 42 creates the test machining program when the operator operates the create button BN1. In this embodiment, the program creating unit 42 creates the test machining program for an operation in which part of a rectangular parallelepiped-shaped test workpiece is cut off at the angle specified by the operator, so as to obtain a truncated quadrangular pyramid-shaped test workpiece having one inclined surface. This reduces machining time and machining load as compared to actual machining operations for actually producing a product.

The movement control unit 44 is configured to control the driving unit 22. The movement control unit 44 controls at least one of the U-direction and V-direction motors of the driving unit 22, using the angle θ' (FIG. 2) that is specified by the test machining program and the first and second information stored in the storage unit 36. In this way, the movement control unit 44 relatively moves at least one of the first die guide 16*a* and the second die guide 16*b* relative to the test workpiece so that the wire electrode 12 inclines at the angle θ' specified by the test machining program. Note that the angle θ' specified by the test machining program is the angle that the operator specified by inputting it to the input item (FIG. 4) using the input unit 32.

After the movement control unit 44 has relatively moved at least one of the first die guide 16*a* and the second die guide 16*b* relative to the test workpiece in order to incline the wire electrode 12, then it starts machining.

Specifically, the movement control unit 44 machines the test workpiece into a given shape by controlling at least one of the X-direction, Y-direction, U-direction, and V-direction motors of the driving unit 22 according to the test machining program to thereby relatively move the wire electrode 12 relative to the test workpiece.

The dimension acquisition unit 46 is configured to acquire measured dimensions of the test workpiece. The dimension acquisition unit 46 acquires measured dimensions of the test workpiece that has been machined with the wire electrode 12 inclined. The dimension acquisition unit 46 may acquire measured dimensions inputted by the operator using the input unit 32, or may acquire measured dimensions from a certain measurement device.

Figure 5:
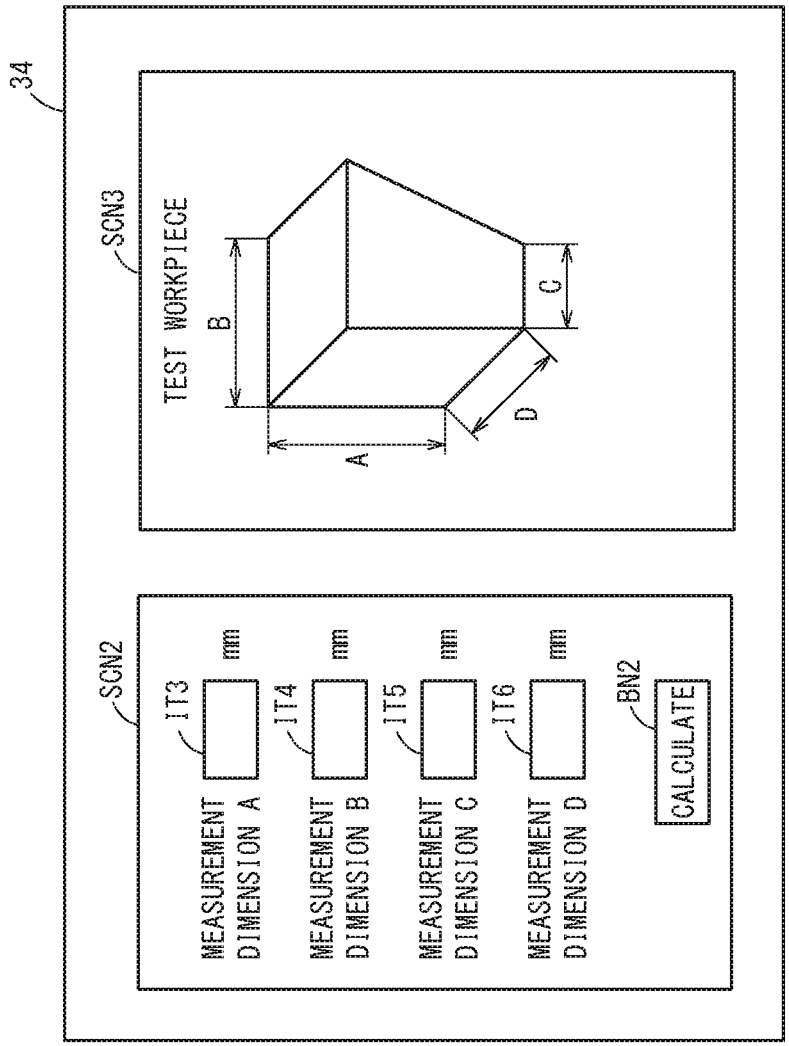
FIG. 5 is a diagram illustrating a dimension input screen and an external appearance screen.

In this embodiment, it is assumed that the dimension acquisition unit 46 acquires measured dimensions that are entered by the operator using the input unit 32. That is, as shown in FIG. 5, for example, the dimension acquisition unit 46 causes the display unit 34 to display a dimension input screen SCN2 for input of measured dimensions of the machined test workpiece. This enables the operator to clearly grasp the details of the measured dimensions that are necessary for computation.

The dimension input screen SCN2 includes a plurality of input items IT3 to IT6 for input of measured dimensions of the test workpiece that has been machined into a truncated quadrangular pyramid shape having one inclined surface, and a calculate button BN2 for starting computation using the values inputted to the input items IT3 to IT6. The operator enters corresponding measured dimensions respectively to the plurality of input items IT3 to 116 using the input unit 32, and thereafter operates the calculate button BN2.

In this embodiment, the dimension acquisition unit 46 causes the display unit 34 to display an external appearance screen SCN2 showing the external appearance of the test workpiece after having been machined, together with the dimension input screen SCN2 explained above. This reduces input error of the measured dimensions on the dimension input screen SCN2.

As a measured dimension, a thickness ("measured dimension A" in FIG. 5) of the test workpiece that has been machined into the truncated quadrangular pyramid shape with one inclined surface is inputted to the input item IT3. As a measured dimension, an upper base ("measured dimension B" in FIG. 5) of the test workpiece having been machined into the truncated quadrangular pyramid shape with one inclined surface is inputted to the input item IT4. As a measured dimension, a lower base ("measured dimension C" in FIG. 5) of the test workplace having been machined into the truncated quadrangular pyramid shape with one inclined surface is inputted to the input item IT5. As a measured dimension, a depth ("measured dimension D" in FIG. 5) of the test workpiece having been machined into the truncated quadrangular pyramid shape with one inclined surface is inputted to the input item IT6.

The computation unit 48 is configured to calculate first actual information indicating the actual holding position Pa (FIG. 2) at which the wire electrode 12 is actually held by the first die guide 16a, and second actual information indicating the actual holding position Pb (FIG. 2) at which the wire electrode 12 is actually held by the second die guide 16b. The computation unit 48 includes a first computation portion (first computation unit) 48a for calculating the first actual information and a second computation portion (second computation unit) 48b for calculating the second actual information.

Figure 6:
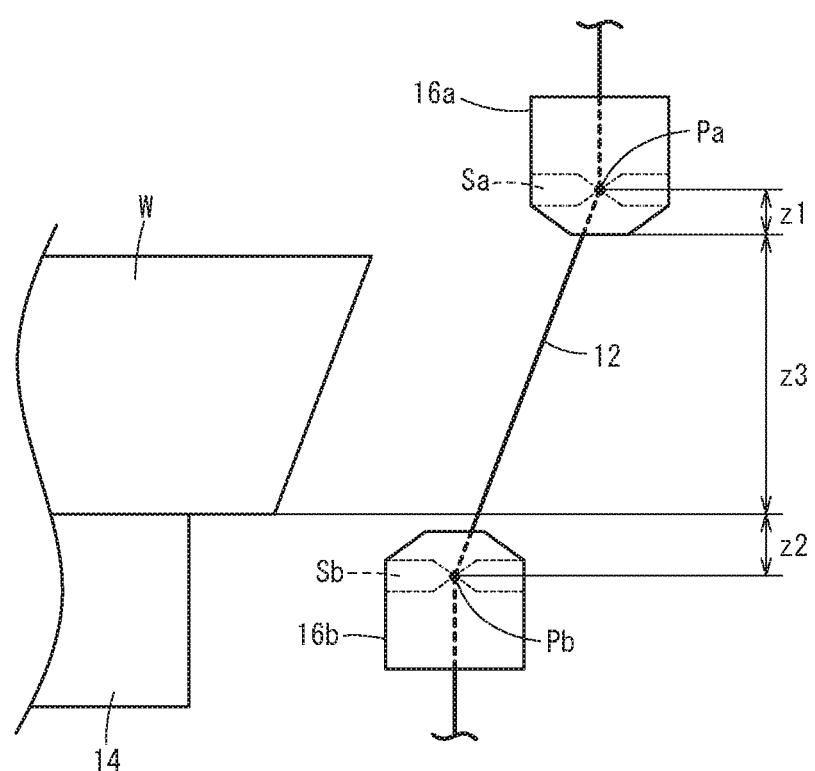
FIG. 6 is a diagram concerning a distance between a support position at a first die guide and a support position at the second die guide.

As shown in FIG. 1, in this embodiment, the first information is the distance z1' of the holding position P'a from the feeding-out end surface of the first die guide 16a along the +Z direction. Accordingly, as shown in FIG. 6, the first actual information is the distance of the actual holding position Pa from the feeding-out end surface of the first die guide 16a along the +Z direction. Further, as shown in FIG. 1, the second information is the distance z2' of the holding position P'b from the placement surface of the table 14 along the −Z direction. Accordingly, as shown in FIG. 6, the second actual information is the distance z2 of the actual holding position Pb from the placement surface of the table 14 along the −Z direction. Note that, for convenience, the structure is viewed from different points in FIGS. 1 and 6.

For example, the first computation portion 48a calculates the first actual information (distance z1) according to the formula below, based on the measured dimensions acquired by the dimension acquisition unit 46 and the angle specified by the operator using the input unit 32 (the angle θ' specified by the test machining program).

$$z1 = \frac{A \times (z1' + z2' + z3)\tan\theta}{B - C} - (z2 + z3) \quad (1)$$

In formula (1), "A" denotes the value inputted to the input item IT3, "B" denotes the value inputted to the input item IT4, and "C" denotes the value inputted to the input item IT5. Further, in formula (1), "z3" denotes an actual distance between the placement surface on which the workpiece W is placed and the feeding-out end surface of the first die guide 16a.

For example, the second computation portion 48b calculates the second actual information (distance z2) according to the formula below, based on the measured dimensions acquired by the dimension acquisition unit 46 and the angle specified by the operator using the input unit 32 (the angle θ' specified by the test machining program).

$$z2 = \frac{A \times z2'\tan\theta}{B - C} + \frac{A \times (C - D)}{B - C} \quad (2)$$

In formula (2), the distance z2 is calculated taking into consideration occurrence of deviations in the angle of the inclined portion of the machined test workpiece and in the vertically machined and wire-inclined machined portions that would occur because of a deviation between the actual holding position Pb of the wire electrode 12 and the holding position P'b of the wire electrode 12 recognized by the control device 30. The first term of formula (2) corresponds to compensating the inclination angle, and the second term of formula (2) corresponds to compensating the support position such that the wire-inclined machined and vertically machined portions are machined with the same dimensions. "D" in formula (2) denotes the value inputted to the input item IT6. Further, in formula (2), the same symbols as those in formula (1) denote the same contents explained about formula (1).

Figure 7:
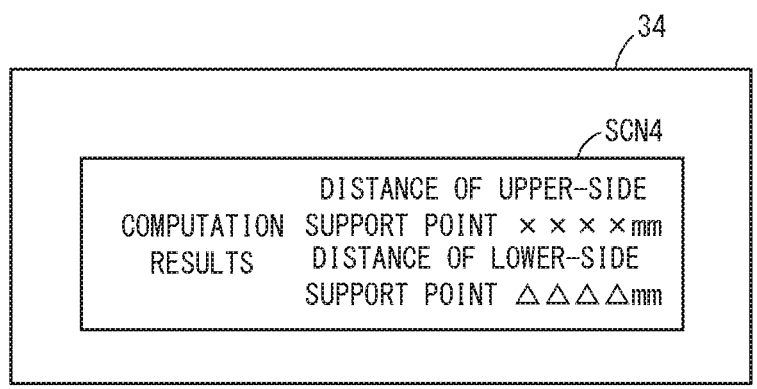
FIG. 7 is a diagram illustrating a computation result screen.

Having calculated the first actual information (distance z1) and second actual information (distance z2), then, as shown in FIG. 7, the computation unit 48 causes the display unit 34 to display a computation result screen SCN4 including the calculated first actual information (distance z1) and second actual information (distance z2). This enables the operator to grasp the first actual information (distance z1) and the second actual information (distance z2).

The compensation unit 50 is configured to compensate the first information and second information stored in the storage unit 36. The compensation unit 50 compares the first information (distance z1') stored in the storage unit 36 and the first actual information (distance z1) calculated by the first computation portion 48a. If the first information and the first actual information coincide with each other, the compensation unit 50 does not compensate the first information.

On the other hand, if the first information and the first actual information differ from each other, the compensation unit 50 rewrites the first information to the first actual information.

In the same way, the compensation unit 50 compares the second information (distance z2') stored in the storage unit 36 and the second actual information (distance z2) calculated by the second computation portion 48b. If the second information and the second actual information coincide with each other, the compensation unit 50 does not compensate the second information. On the other hand, if the second information and the second actual information differ from each other, the compensation unit 50 rewrites the second information to the second actual information.

In this way, if at least one of the first information and second information stored in the storage unit 36 differs from the information calculated from the measured dimensions, then the compensation unit 50 rewrites the first information and second information to those calculated from the measured dimensions. This reduces the possibility of machining a workpiece at an angle different from the angle θ' specified by the test machining program when the wire electrode 12 is inclined, and thus the machining accuracy can be improved.

Figure 8:
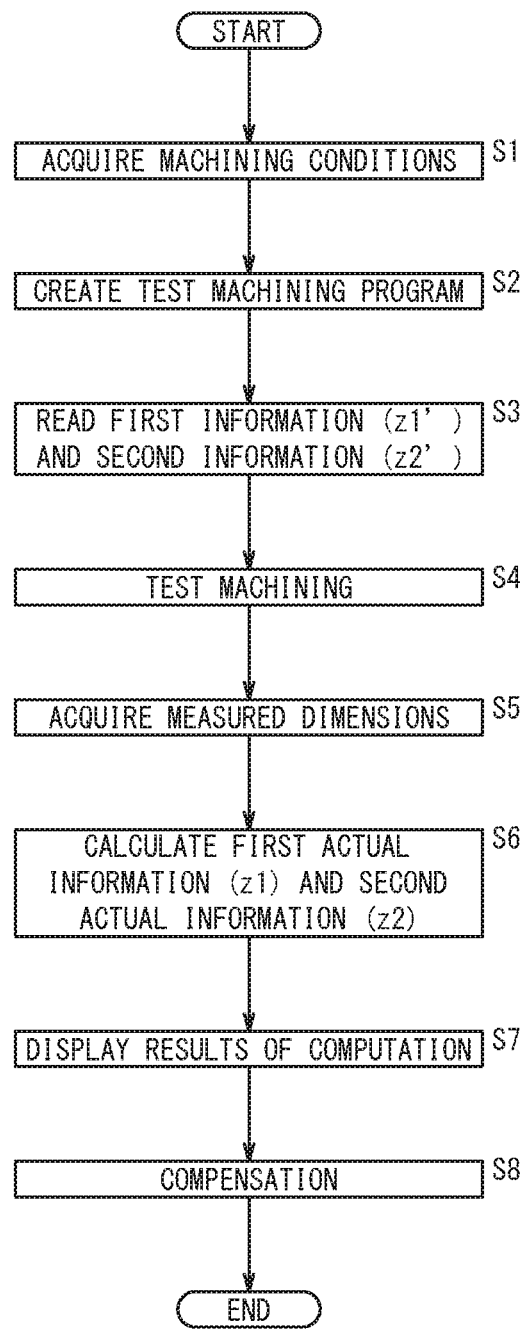
FIG. 8 is a flowchart illustrating a control process.

Next, the control process performed by the control device 30 will be described, concerning a method for controlling the wire electrical discharge machine 10. FIG. 8 is a flowchart showing the control process.

For example, when an operation to issue a command for the execution of test machining is made using the input unit 32, then, at step S1, the condition acquisition unit 40 causes the display unit 34 to display the condition input screen SCN1 (FIG. 4) for input of the angle of the wire electrode 12 with respect to its running direction and the thickness of the test workpiece. Here, the operator specifies the angle of the wire electrode 12 with respect to its running direction and the thickness of the test workpiece by providing inputs on the condition input screen SCN1 using the input unit 32. The condition acquisition unit 40 thus acquires the angle of the wire electrode 12 with respect to its running direction and the thickness of the test workpiece specified by the operator, and then the process moves to step S2.

At step S2, the program creating unit 42 creates a test machining program on the basis of the angle of the wire electrode 12 with respect to its running direction and the thickness of the test workpiece that the condition acquisition unit 40 has acquired at step S1, and then the process moves to step S3.

At step S3, the movement control unit 44 reads the first information (distance z1') and second information (distance z2') stored in the storage unit 36, and the process moves to step S4.

At step S4, using the first information and second information read in step S3, the movement control unit 44 relatively moves the die guides 16 relative to the test workpiece such that the wire electrode 12 inclines at the angle θ' specified by the test machining program created at step S2. After that, the movement control unit 44 machines the test workpiece (test machining) by causing the wire electrode 12 to move relative to the test workpiece according to the test machining program created at step S2. Then, the process moves to step S5.

At step S5, the dimension acquisition unit 46 causes the display unit 34 to display the dimension input screen SCN2 (FIG. 5) for input of the measured dimensions of the test workpiece that has been machined at step S4, together with the external appearance screen SCN3 (FIG. 5) showing the external appearance of the test workpiece. Here, while referring to the external appearance screen SCN3, the operator enters the measured dimensions of the test workpiece on the dimension input screen SCN2 using the input unit 32. The dimension acquisition unit 46 thus acquires the measured dimensions of the test workpiece entered by the operator, and then the process moves to step S6.

At step S6, the computation unit 48 calculates the first actual information (z1) and the second actual information (z2) on the basis of the measured dimensions acquired by the dimension acquisition unit 46 at step S5 and the first information (distance z1') and the second information (distance z2') stored in the storage unit 36. The process then moves to step S7.

At step S7, the computation unit 48 causes the display unit 34 to display the computation result screen SCN4 (FIG. 7) including the first actual information (z1) and the second actual information (z2) calculated at step S6, and then the process moves to step S8.

At step S8, if the first information (distance z1') stored in the storage unit 36 differs from the first actual information (z1) calculated at step S6, then the compensation unit 50 rewrites the first information (distance z1') to the first actual information (z1). Further, if the second information (distance z2') stored in the storage unit 36 differs from the second actual information (z2) calculated at step S6, then the compensation unit 50 rewrites the second information (distance z') to the second actual information (z2). The control process is then terminated.

The dimension acquisition unit 46 may display the dimension input screen SCN2 (FIG. 5) and the external appearance screen SCN3 (FIG. 5) at step S1 together with the condition input screen SCN1 on the same screen.

Further, the computation unit 48 may display the computation result screen SCN4 (FIG. 7) at step S1 together with the condition input screen SCN1 on the same screen, and also at step S5 together with the dimension input screen SCN2 (FIG. 5) and the external appearance screen SCN3 (FIG. 5) on the same screen. In this case, at step S7, the computation unit 48 causes the first actual information (z1) and the second actual information (z2) calculated at step S6 to be displayed in given positions on the computation result screen SCN4 that was already displayed on the display unit 34 at step S1 or step S5.

Modifications

The embodiment described above can be modified as shown below.

Figure 9:
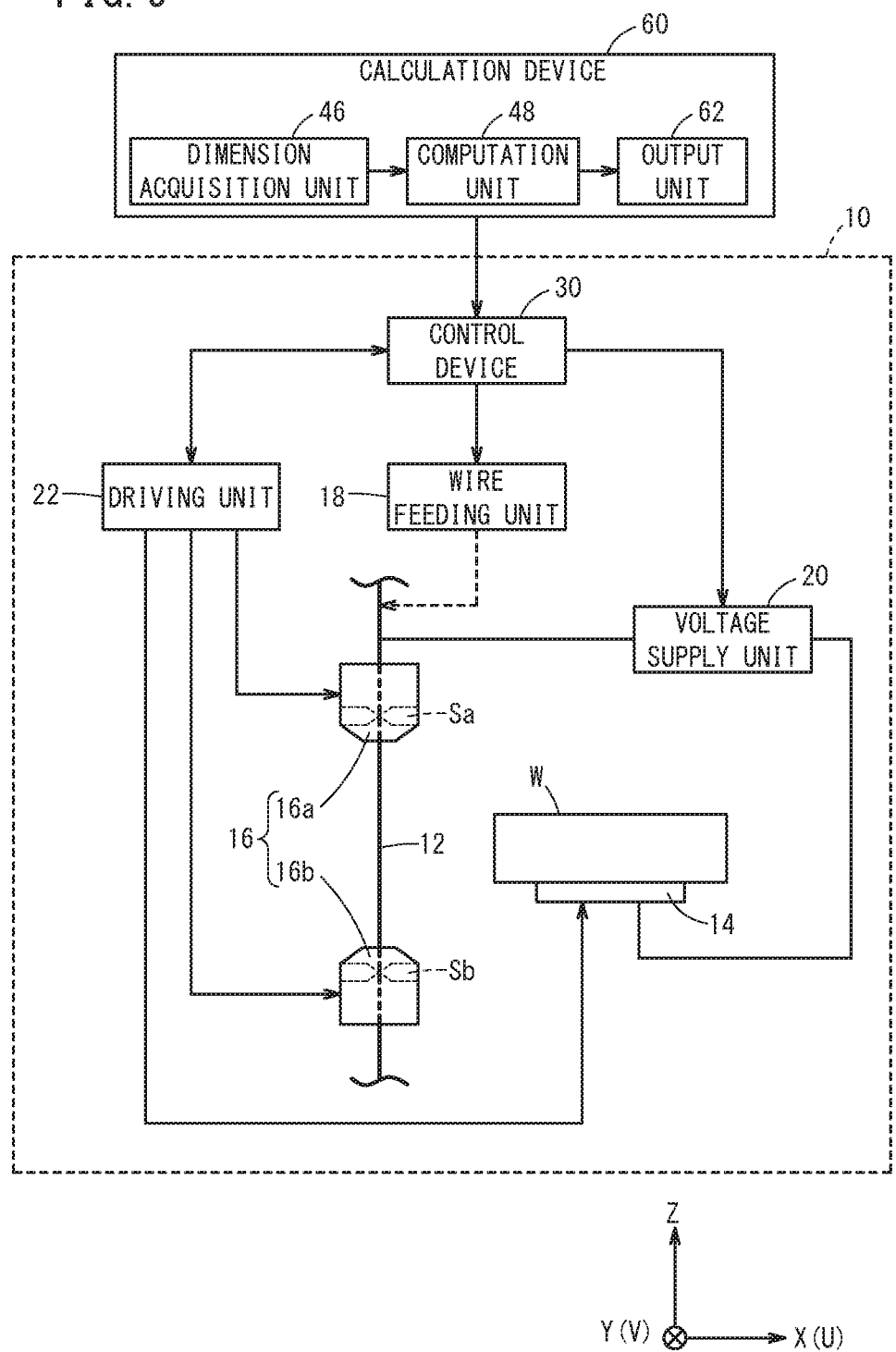
FIG. 9 is a schematic diagram illustrating the configuration of an electrical discharge system according to a modification.

FIG. 9 is a schematic diagram illustrating the configuration of an electrical discharge system 100 according to a modification. In FIG. 9, components equivalent to those described in the embodiment above are labeled using the same reference numerals. Features already described in the embodiment above will not be described again in this modification.

The electrical discharge system 100 includes a wire electrical discharge machine 10 and a calculation device 60. Among the functions of the signal processing unit 38 described above, i.e., among the condition acquisition unit 40, program creating unit 42, movement control unit 44, dimension acquisition unit 46, computation unit 48, and compensation unit 50, the dimension acquisition unit 46 and the computation unit 48 are removed from the control device 30 of the wire electrical discharge machine 10.

The calculation device 60 is connected to the wire electrical discharge machine 10 and includes the dimension acquisition unit 46 and the computation unit 48 that have been removed from the control device 30, and it further includes an output unit 62. The output unit 62 outputs the first actual information and second actual information calculated by the computation unit 48 based on the measured dimensions of the machined test workpiece, to the control device 30 of the wire electrical discharge machine 10 which machined that test workpiece.

With this configuration, the control device 30 can rewrite the first information and second information stored in the storage unit 36 to the first actual information and second actual information outputted from the calculation device 60. Thus, as in the embodiment above, it is possible to reduce the possibility of machining a workpiece at an angle different from the angle θ' specified by the test machining program when the wire electrode 12 is inclined. This improves machining accuracy.

In the electrical discharge system 100 above, the calculation device 60 is connected to a single wire electrical discharge machine 10. However, the calculation device 60 may be connected to a plurality of wire electrical discharge machines 10 through a network. In this case, the calculation device 60 calculates the first actual information and second actual information for each wire electrical discharge machine 10 on the basis of the measured dimensions of the machined test workpiece, and outputs the information through the network to the control device 30 of the wire electrical discharge machine 10 that has machined that test workplace. This makes it possible to collectively improve machining accuracies of a plurality of wire electrical discharge machines 10 with the single calculation device 60.

Invention Obtained from Embodiments

The invention graspable from the embodiments described above will be recited below.

First Invention

A first invention provides a control device (30) of a wire electrical discharge machine (10) that machines a workpiece (W) by causing electrical discharge at an electrode gap between the workpiece (W) and a wire electrode (12) that runs along a given running direction.

The control device (30) includes: a storage unit (36) configured to store first information indicating a holding position (P' a) of the wire electrode (12) at a first die guide (16a) configured to guide the wire electrode (12) to the workpiece (W), and second information indicating a holding position (P'b) of the wire electrode (12) at a second die guide (16b) configured to guide the wire electrode (12) sent from the workpiece (W); a movement control unit (44) configured to, using the first information and the second information, relatively move at least one of the first die guide (16a) and the second die guide (16b) relative to a test workpiece being the workpiece (W) such that the wire electrode (12) inclines at a given angle with respect to the running direction; a dimension acquisition unit (46) configured to acquire a measured dimension of the test workpiece that has been machined with the wire electrode (12) inclined; a computation unit (18) configured to calculate, based on the measured dimension, first actual information indicating an actual holding position (Pa) at which the wire electrode (12) is actually held at the first die guide (16a), and second actual information indicating an actual holding position (Pb) at which the wire electrode (12) is actually held at the second die guide (16b); and a compensation unit (50) configured to rewrite the first information to the first actual information if the first information and the first actual information differ from each other, and to rewrite the second information to the second actual information if the second information and the second actual information differ from each other.

Thus, it is possible to prevent the workpiece (W) from being machined at an angle different from the angle specified by a machining program when the wire electrode (12) is inclined. This improves machining accuracy.

The dimension acquisition unit (46) may cause a display unit (34) to display a dimension input screen (SCN2) for input of the measured dimension. This makes it possible for the operator to clearly grasp the details of measured dimensions that are necessary for the computation performed by the computation unit (48).

The dimension acquisition unit (46) may display an external appearance screen (SCN3) showing an external appearance of the test workpiece after having been machined, together with the dimension input screen (SCN2). It is thus possible to reduce input error on the dimension input screen (SCN2).

The control device (30) may further include: a condition acquisition unit (40) configured to acquire the angle and a thickness of the test workpiece; and a program creating unit (42) configured to create a test machining program for machining the test workplace, based on the angle and the thickness of the test workplace, wherein the movement control unit (44) may relatively move at least one of the first die guide (16a) and the second die guide (16b) relative to the test workpiece, using the first information, the second information, and the test machining program. This reduces time and labor required for the operator to perform a machining operation.

The condition acquisition unit (40) may cause a display unit (34) to display a condition input screen (SN1) for input of the angle and the thickness of the test workpiece. This enables the operator to clearly grasp machining conditions that are necessary to create the test machining program.

The computation unit (48) may cause a display unit (34) to display the first actual information and the second actual information. This enables the operator to grasp the first actual information and the second actual information.

Second Invention

A second invention provides a calculation device (60). The calculation device (60) includes: a dimension acquisition unit (46) configured to acquire a measured dimension of a test workpiece that has been machined with a wire electrode (12) inclined at a given angle with respect to a running direction of the wire electrode (12); a first computation unit (48a) configured to calculate, based on the measured dimension, first actual information indicating an actual holding position (Pa) of the wire electrode (12) at which the wire electrode (12) is actually held at a first die guide (16a) configured to guide the wire electrode (12) to a workpiece (W); a second computation unit (48b) configured to calculate, based on the measured dimension, second actual information indicating an actual holding position (Pb) of the wire electrode (12) at which the wire electrode (12) is actually held at a second die guide (16b) configured to guide the wire electrode (12) sent from the workpiece (W); and an output unit (62) configured to output the first actual information and the second actual information to a control device (30) of a wire electrical discharge machine (10) that has machined the test workpiece.

Thus, the control device (30) can rewrite first information and second information stored in a storage unit (36) to the first actual information and the second actual information outputted from the calculation device (60). Then, when the wire electrode (12) is inclined, it is possible to prevent a workpiece from being machined at an angle different from an angle specified by a machining program, thereby resulting in improved machining accuracy.

Third Invention

A third invention provides a method for controlling a wire electrical discharge machine (10) that machines a workpiece (W) by causing electrical discharge at an electrode gap between the workpiece (W) and a wire electrode (12) that runs along a given running direction.

The control method includes: a reading step (S3) of reading from a storage unit (36), first information indicating a holding position (P'a) of the wire electrode (12) at a first die guide (16a) for guiding the wire electrode (12) to the workpiece (W), and second information indicating a holding position (P' b) of the wire electrode (12) at a second die guide (16b) for guiding the wire electrode (12) sent from the workpiece (W); a movement control step (S4) of relatively moving, using the first information and the second information, at least one of the first die guide (16a) and the second die guide (16b) relative to a test workpiece being the workpiece such that the wire electrode (12) inclines at a given angle with respect to the running direction; a dimension acquisition step (S5) of acquiring a measured dimension of the test workpiece that has been machined with the wire electrode (12) inclined; a computation step (S6) of calculating, based on the measured dimension, first actual information indicating an actual holding position (Pa) at which the wire electrode (12) is actually held at the first die guide (16a), and second actual information indicating an actual holding position (Pb) at which the wire electrode (12) is actually held at the second die guide (16b); and a compensation step (S8) of rewriting the first information to the first actual information if the first information and the first actual information differ from each other, and rewriting the second information to the second actual information if the second information and the second actual information differ from each other.

Thus, it is possible to prevent the workpiece (W) from being machined at an angle different from an angle specified by a machining program when the wire electrode (12) is inclined. This improves machining accuracy.

The dimension acquisition step (S5) may cause a display unit (34) to display a dimension input screen (SCN2) for input of the measured dimension. Thus, this enables the operator to clearly grasp the details of measured dimensions that are necessary for the computation performed in the computation step (S6).

The dimension acquisition step (35) may display an external appearance screen (SCN3) showing an external appearance of the test workpiece after having been machined, together with the dimension input screen (SCN2). It is thus possible to reduce input error on the dimension input screen (SCN2).

The control method may further include: a condition acquisition step (S1) of acquiring the angle and a thickness of the test workpiece; and a program creating step (S2) of creating a test machining program for machining the test workpiece, based on the angle and the thickness of the test workpiece, wherein the movement control step (S4) may relatively move at least one of the first die guide (16a) and the second die guide (16b) relative to the test workpiece, using the first information, the second information, and the test machining program. This reduces time and labor required for the operator to perform a machining operation.

The condition acquisition step (S1) may cause a display unit (34) to display a condition input screen (SCN1) for input of the angle and the thickness of the test workpiece. This enables the operator to clearly grasp machining conditions that are necessary to create the test machining program.

The computation step (S6) may cause a display unit (34) to display the first actual information and the second actual information. This enables the operator to grasp the first actual information and the second actual information.

The present invention is not particularly limited to the embodiment described above, and various modifications are possible without departing from the essence and gist of the present invention.

What is claimed is:

1. A control device of a wire electrical discharge machine that machines a workpiece by causing electrical discharge at an electrode gap between the workpiece and a wire electrode that runs along a given running direction, the control device comprising:
   a storage unit configured to store first information indicating a holding position of the wire electrode at a first die guide configured to guide the wire electrode to the workpiece, and second information indicating a holding position of the wire electrode at a second die guide configured to guide the wire electrode sent from the workpiece;
   a movement control unit configured to, using the first information and the second information, relatively move at least one of the first die guide and the second die guide relative to a test workpiece being the workpiece so that the wire electrode inclines at a given angle with respect to the running direction;
   a dimension acquisition unit configured to acquire a measured dimension of the test workpiece that has been machined with the wire electrode inclined;
   a computation unit configured to calculate, based on the measured dimension, first actual information indicating an actual holding position at which the wire electrode is actually held at the first die guide, and second actual information indicating an actual holding position at which the wire electrode is actually held at the second die guide; and
   a compensation unit configured to rewrite the first information to the first actual information if the first information and the first actual information differ from each other, and to rewrite the second information to the second actual information if the second information and the second actual information differ from each other.

2. The control device according to claim 1, wherein the dimension acquisition unit causes a display unit to display a dimension input screen for input of the measured dimension.

3. The control device according to claim 2, wherein the dimension acquisition unit displays an external appearance screen showing an external appearance of the test workpiece after having been machined, together with the dimension input screen.

4. The control device according to claim 1, further comprising:
   a condition acquisition unit configured to acquire the angle and a thickness of the test workpiece; and
   a program creating unit configured to create a test machining program for machining the test workpiece, based on the angle and the thickness of the test workpiece, wherein the movement control unit relatively moves at least one of the first die guide and the second die guide relative to the test workpiece, using the first information, the second information, and the test machining program.

5. The control device according to claim 4, wherein the condition acquisition unit causes a display unit to display a condition input screen for input of the angle and the thickness of the test workpiece.

6. The control device according to claim 1, wherein the computation unit causes a display unit to display the first actual information and the second actual information.

7. A calculation device comprising:
a dimension acquisition unit configured to acquire a measured dimension of a test workpiece that has been machined with a wire electrode inclined at a given angle with respect to a running direction of the wire electrode;
a first computation unit configured to calculate, based on the measured dimension, first actual information indicating an actual holding position of the wire electrode at which the wire electrode is actually held at a first die guide configured to guide the wire electrode to a workpiece;
a second computation unit configured to calculate, based on the measured dimension, second actual information indicating an actual holding position of the wire electrode at which the wire electrode is actually held at a second die guide configured to guide the wire electrode sent from the workpiece; and
an output unit configured to output the first actual information and the second actual information to a control device of a wire electrical discharge machine that has machined the test workpiece.

8. A control method for controlling a wire electrical discharge machine that machines a workpiece by causing electrical discharge at an electrode gap between the workpiece and a wire electrode that runs along a given running direction, the control method comprising:
a reading step of reading from a storage unit, first information indicating a holding position of the wire electrode at a first die guide configured to guide the wire electrode to the workpiece, and second information indicating a holding position of the wire electrode at a second die guide configured to guide the wire electrode sent from the workpiece;
a movement control step of relatively moving, using the first information and the second information, at least one of the first die guide and the second die guide relative to a test workpiece being the workpiece so that the wire electrode inclines at a given angle with respect to the running direction;
a dimension acquisition step of acquiring a measured dimension of the test workpiece that has been machined with the wire electrode inclined;
a computation step of calculating, based on the measured dimension, first actual information indicating an actual holding position at which the wire electrode is actually held at the first die guide, and second actual information indicating an actual holding position at which the wire electrode is actually held at the second die guide; and
a compensation step of rewriting the first information to the first actual information if the first information and the first actual information differ from each other, and rewriting the second information to the second actual information if the second information and the second actual information differ from each other.

9. The control method according to claim 8, wherein the dimension acquisition step causes a display unit to display a dimension input screen for input of the measured dimension.

10. The control method according to claim 9, wherein the dimension acquisition step displays an external appearance screen showing an external appearance of the test workpiece after having been machined, together with the dimension input screen.

11. The control method according to claim 8, further comprising:
a condition acquisition step of acquiring the angle and a thickness of the test workpiece; and
a program creating step of creating a test machining program for machining the test workpiece, based on the angle and the thickness of the test workpiece,
wherein the movement control step relatively moves at least one of the first die guide and the second die guide relative to the test workpiece, using the first information, the second information, and the test machining program.

12. The control method according to claim 11, wherein the condition acquisition step causes a display unit to display a condition input screen for input of the angle and the thickness of the test workplace.

13. The control method according to claim 8, wherein the computation step causes a display unit to display the first actual information and the second actual information.

* * * * *